United States Patent [19]
Desjardins

[11] Patent Number: 5,280,357
[45] Date of Patent: Jan. 18, 1994

[54] DEPTH-BASED RECURSIVE VIDEO EFFECTS

[75] Inventor: Philip A. Desjardins, Nevada City, Calif.

[73] Assignee: The Grass Valley Group, Inc., Nevada City, Calif.

[21] Appl. No.: 960,050

[22] Filed: Oct. 13, 1992

[51] Int. Cl.$^5$ .................................. H04N 5/262
[52] U.S. Cl. ....................... 358/183; 358/182; 358/22
[58] Field of Search ............... 358/183, 182, 181, 160, 358/22; 340/722, 734, 732; H04N 5/262, 5/272

[56] References Cited

U.S. PATENT DOCUMENTS

| | | | |
|---|---|---|---|
| 4,951,144 | 8/1990 | Des Jardins | 358/183 |
| 4,974,083 | 11/1990 | Bloomfield et al. | 358/183 |
| 5,012,342 | 4/1991 | Olsen et al. | 358/183 |
| 5,077,608 | 12/1991 | Dubner | 358/183 |

Primary Examiner—James J. Groody
Assistant Examiner—Michael H. Lee
Attorney, Agent, or Firm—Francis I. Gray

[57] ABSTRACT

Depth-based recursive video effects are generated by including depth information in the recursive loop. A combined depth coefficient signal output from a depth-based video combiner is modified by a recursive key signal from the recursive image output from the recursive loop. The resulting depth coefficient signal may then be blurred when a recursive blur effect is selected by using an appropriate filter corresponding to that used in the luminance and key recursive loops. The recursive depth coefficient signal from the depth recursive loop is used, together with the depth coefficient signal associated with an incoming image, to produce the priority signal used in the depth-based video combiner.

3 Claims, 1 Drawing Sheet

DEPTH-BASED RECURSIVE VIDEO EFFECTS

BACKGROUND OF THE INVENTION

The present invention relates to video signal processing, and more particularly to depth-based recursive video effects that use depth information inherent in a three dimensional video effects digital picture manipulator (DPM) to automatically transition between over and under trails modes.

Recursive effects use a digital memory to store an image from previous frames of a video signal in order to create a decaying after-image. The video signal and associated key, or opacity, signal for previous frames are recursively decayed and combined with the incoming video signal to create such effects as "over trails" and "under trails". In over trails the incoming image appears over, or in front of, the previous image in the recursive memory. In under trails the incoming image appears under, or in back of, the previous image in recursive memory and is not seen unless the incoming image moves from beneath the stored image or there is some transparency in the stored image, such as from decay of the stored image.

The combining equations for video and key signals for over trails is:

$$V_{OUT} = V_1 + (1-K_1) \times Q \times V_R$$

$$K_{OUT} = K_1 + (1-K_1) \times Q \times K_R$$

where $K_1$ and $K_R$ are the incoming and stored key signals respectively, $V'_1$ and $V'_R$ are the incoming and stored shaped video signals respectively, and Q is a frame-to-frame persistence value between zero and one where zero causes immediate decay and one causes no decay. For under trails the corresponding equations are:

$$V_{OUT} = V_1 \times (1 - Q \times K_R) + Q \times V_R$$

$$K_{OUT} = K_1 \times (1 - Q \times K_R) + Q \times K_R$$

The above equations are special cases of the following priority combiner equations:

$$V_{OUT} = V_1 \times (1 - (1-P) \times Q \times K_R) + (1 - K_1 \times P) \times Q \times V_R$$

$$K_{OUT} = K_1 \times (1 - (1-P) \times Q \times K_R) + (1 - K_1 \times P) \times Q \times K_R$$

between the incoming shaped video and key signals $V'_1$, $K_1$ and the decayed and stored shaped video and key signals $Q \times V'_R$, $Q \times K_R$, where P is a priority control signal value of the incoming image over the stored image. When P=1, the over trails case, the incoming image has priority over the stored image, and when P=0, the under trails case, the stored image has priority, reducing the equations to the special cases above.

By using a priority combiner, such as that disclosed in U.S. Pat. No. 4,851,912 issued Jul. 25, 1989 to Richard A. Jackson and Kevin D. Windrem entitled "Apparatus for Combining Video Signals", intermediate priority levels may be achieved and there is some transparency in the image having priority. In current commercial recursive video effects, the over and under trails are modes specifically selected by the operator based on explicit front panel control. The under and over trails modes may be used to give a feeling of "depth" to the video effect in that the image having priority appears to be closer to the viewer than the image being overwritten.

What is desired are depth-based recursive video effects that use depth information inherent in a three-dimensional DPM unit to automatically transition on a pixel by pixel basis between over and under trails modes.

SUMMARY OF THE INVENTION

Accordingly the present invention provides depth-based recursive video effects that use depth information to automatically transition between over and under trails modes. A depth-based video combiner has two shaped video inputs, one an incoming video signal and the other a recursive video signal from a video memory. These video signals are combined as a function of respective key signals and a priority signal. The priority signal is derived from an incoming depth coefficient signal and a recursive combined depth coefficient signal. As the priority signal varies from a value of one to zero, the depth-based recursive video effects varies automatically from over to under trails, and vice versa.

The objects, advantages and novel features of the present invention are apparent from the following detailed description when read in conjunction with the appended claims and attached drawing.

DESCRIPTION OF THE PREFERRED EMBODIMENT

Figure 1:
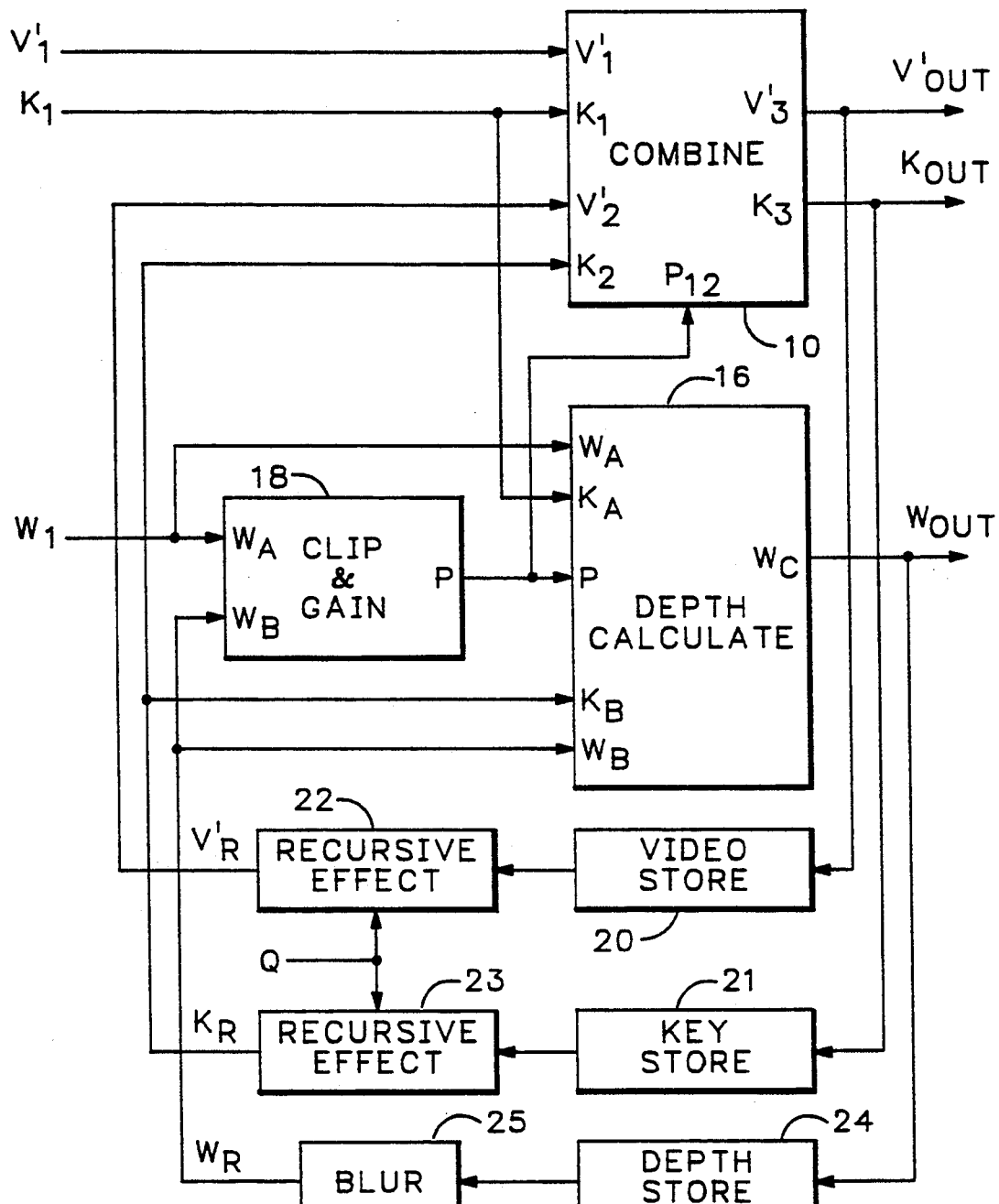
FIG. 1 is a block diagram of a priority depth-based combiner with recursive video effects according to the present invention.

Referring now to FIG. 1 a priority combiner 10 has as inputs two images, each image having a shaped video signal $V'_1$, $V'_R$ and a key signal $K_1$, $K_R$. One image $V'_1$, $K_1$ comes from an incoming video source and the other $V'_R$, $K_R$ comes from recursive video and key memories 20, 21 via recursive effect circuits 22, 23. The recursive image, video and key signals, is multiplied by a persistence factor Q in the recursive effect circuit 22. It could also be modified by one or more of several modifiers possible with a recursive memory, such as recursive blur as described in U.S. Pat. No. 4,951,144 issued Aug. 21, 1990 to Philip A. DesJardins entitled "Recursive Video Blur Effect", hue rotations as described in U.S. Pat. No. 5,153,711 issued Oct. 6, 1992 to Philip A. DesJardins entitled "Recursive Video Hue Rotations to Obtain a Rainbow-Like Decaying After-Image", or star effects as is well known in the prior art. Each image also has a depth coefficient signal $W_1$, $W_R$ corresponding to the distance each pixel is from the viewer prior to perspective projection. The recursive depth coefficient signal $W_R$ comes from a recursive depth memory 24 via a recursive depth circuit 25. The depth coefficient signals are input to a clip and gain circuit 18 to generate a priority signal P that acts as a control signal for the combiner 10 to control the priority of the incoming image with respect to the recursive image. The depth coefficient signals, key signals and priority signal also are input to a depth calculator 16, described in co-pending U.S. patent application Ser. No. 07/960-325 filed Oct. 13, 1992 by Philip A. DesJardins entitled "Depth-Based Video Combining".

As discussed in the above-identified co-pending U.S. Patent Application depth may be represented as Z, the viewing distance, where larger values represent depths farther from the viewer, or as W, the depth coefficient, where smaller values represent depths farther from the viewer. The priority signal P is based on the relative distance to the viewer, with closer objects overwriting farther objects and therefore having greater priority. Intermediate values of P add pleasing softness for intersecting images.

In recursive blur effects the blurring process may extend an object outside of its original boundaries. Because of the blurring of the recursive key signal, this extension is usually semi-transparent. Blurring creates objects for pixels where there weren't any before, and these pixels need to have a depth assigned to them. The best way to create a depth coefficient for these pixels is to have the digital picture manipulator supply a depth coefficient for all pixels, whether there is currently video in them or not, based on extrapolating the mapping function for the picture manipulation. For instance if the image transform maps a two dimensional source plane into a plane in three dimensions, the mapping equation is a linear equation for all target space pixels whether or not there is an opaque image in them or not. Similarly the depth coefficients from a transformation simulating a page turn may be locally extrapolated near the edges of the transformed video source.

Figure 2:
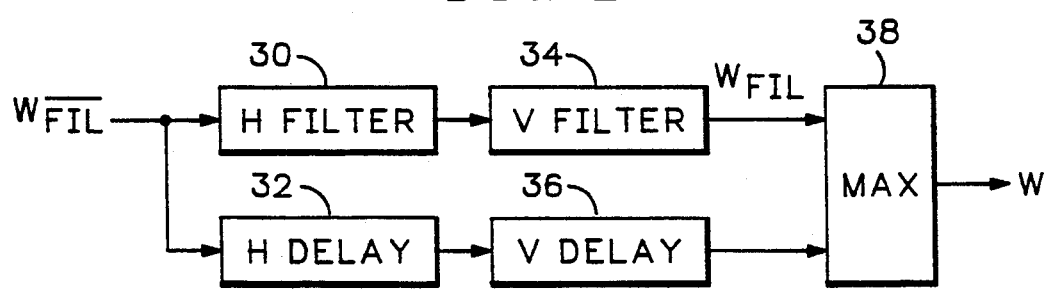
FIG. 2 is a block diagram of a depth blur circuit according to the present invention.

If the depth coefficients for the blurred edges are not acquired from the digital picture manipulator as described above, they may be approximated. As the recursive video and key signals for blurred pixels are a mixture of the values for neighboring pixels, the same is done for depth coefficients. The recursive depth blurring circuit 25 is shown in greater detail in FIG. 2, and uses the same filter characteristics as for luminance (video) or key signals. This means that the depth of blurred objects goes to infinity at the object boundaries, but the object does not have such an appearance as the depth information is only for generating priority, and not for pixel positioning (picture manipulation). The filtering, essentially creating a weighted average, for the recursive depth coefficient signal takes the nearer of the filtered depth coefficient signal $W_{FIL}$ and the unfiltered depth coefficient signal $W_{/FIL}$. The unfiltered depth coefficient signal from the recursive depth store circuit 24 is input to a horizontal filter 30 and to a horizontal delay circuit 32. The horizontal filter 30 performs a standard weighting function over adjacent depth coefficient values corresponding to pixels on a horizontal video line. The horizontally filtered depth coefficient signal is then input to a vertical filter 34, while the delayed unfiltered depth coefficient signal from the horizontal delay circuit 32 is input to a vertical delay circuit 36. The vertical filter 34 performs a similar filtering function as the horizontal filter 30 using depth coefficient values corresponding to pixels on adjacent lines of the video signal. The filtered depth coefficient signal $W_{FIL}$ from the vertical filter 34 is input to a maximum value circuit 38 together with the delayed unfiltered depth coefficient signal $W_{/FIL}$, the delay through the delay circuits 32, 36 compensating for the processing time through the filters 30, 34. The output from the maximum value circuit 38 is the recursive depth coefficient signal $W_R$ which is the maximum between the filtered and unfiltered depth coefficient signals.

Although the video and key signals decay in a recursive loop by multiplication with the persistence factor Q, it is not necessary to multiply the recursive depth coefficient signal with the persistence factor. This is essentially already done in the depth calculator 16. As described in the above-mentioned co-pending U.S. Patent Application, the depth calculator 16 generates a mixing coefficient that is linearly proportional to the opacity, represented by the key signal, and this, therefore, modifies the depth coefficient signal according to the transparency given by the fading key signal.

Thus the present invention provides depth-based recursive video effects by generating a recursive depth coefficient signal together with the recursive video and key signals that is used in combination with an incoming depth coefficient signal to generate a priority signal for controlling a depth-based video combiner.

What is claimed is:

1. In a depth-based video combiner of the type for combining a pair of images, each image having a shaped video signal and a key signal, on the basis of a priority signal derived from depth coefficient signals associated with each image to produce a combined image, an apparatus for producing depth-based recursive effects comprising:

means for generating a recursive image from the combined image as a function of a persistence factor, the recursive image being one input to the depth-based video combiner and an incoming image being the other input; and means for generating a recursive depth coefficient signal from a combined depth coefficient signal output from the depth-based video combiner, the recursive depth coefficient signal corresponding to the recursive image and being a function of a recursive key signal from the recursive image and a desired recursive video effect, the recursive depth coefficient signal together with the depth coefficient signal associated with the incoming image being used to produce the priority signal.

2. An apparatus as recited in claim 1 wherein the recursive depth coefficient signal generating means comprises:

means for storing the combined depth coefficient signal; and means for blurring the stored combined depth coefficient signal to produce the recursive depth coefficient signal.

3. An apparatus as recited in claim 2 wherein the recursive image generating means comprises:

means for storing the shaped video and key signals for the combined image; and means for generating the recursive image from the stored shaped video and key signals as a function of the persistence factor and the desired recursive video effect.

* * * * *